United States Patent

[11] 3,629,029

| [72] | Inventor | Joseph M. Holahan<br>Anderson, S.C. |
|---|---|---|
| [21] | Appl. No. | 5,240 |
| [22] | Filed | Jan. 23, 1970 |
| [45] | Patented | Dec. 21, 1971 |
| [73] | Assignee | True Temper Corporation<br>Cleveland, Ohio |

[54] METHOD OF MAKING SECTIONAL RODS
13 Claims, 18 Drawing Figs.

[52] U.S. Cl. .................................................... 156/189,
156/190, 156/191, 156/193, 156/242, 156/244
[51] Int. Cl. .................................................... B31c
[50] Field of Search ........................................ 156/189,
191, 187, 195, 193, 242, 244, 190

[56] References Cited
UNITED STATES PATENTS

| 3,166,319 | 1/1965 | Brilhart | 156/189 X |
| 3,044,256 | 7/1962 | Bayly et al. | 156/189 |
| 2,966,101 | 12/1960 | Fienup | 156/193 X |
| 2,571,717 | 10/1951 | Howald et al. | 156/185 X |
| 3,191,289 | 6/1965 | Fleischer | 156/189 X |
| 3,442,738 | 5/1969 | Scott et al. | 156/189 X |

*Primary Examiner*—Carl D. Quarforth
*Assistant Examiner*—Gary G. Solyst
*Attorney*—J. H. Slough ABSTRACT: Single piece hollow rod blanks of fiber glass reinforced plastic are formed upon mandrels having stepdown portions intermediate the ends thereof. Mandrels are wrapped in resin impregnated fiber glass cloth having the majority of the fibers disposed parallel with the axes of the mandrels. Upon curing of the plastic, the mandrels are withdrawn and the stepdown portions are cut out of the blanks leaving a plurality of individual sections of hollow sectional rods. The diameters on either side of the stepdown portions of the mandrels are such that a smaller diameter section of each rod is provided with a shank, and a larger diameter section is provided with a socket adapted to receive the shank. Modifications comprise tapering the mandrel on either side of the stepdown portion to provide a tapered shank and socket fit, and providing a reinforcing ply in the area of the shank, socket, and stepdown portions or other area of the rod.

PATENTED DEC 21 1971    3,629,029

INVENTOR.
Joseph M. Holahan
BY
J. H. SLOUGH
ATTORNEY

INVENTOR.
Joseph M. Holahan
BY
J. H. SLOUGH
ATTORNEY

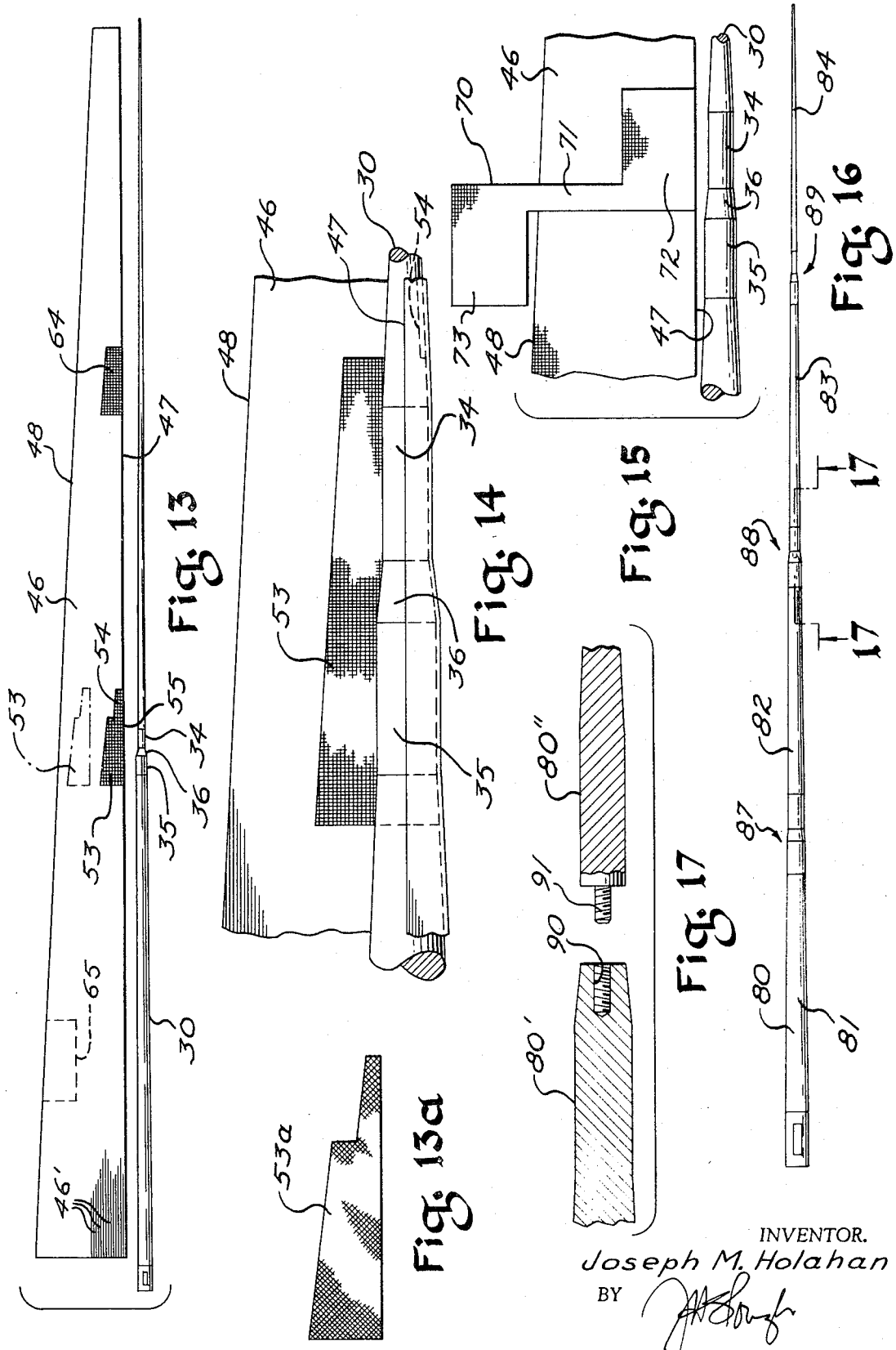

METHOD OF MAKING SECTIONAL RODS

This invention relates to sectional rods, and to a method and means for manufacturing such rods.

In the present invention as herein disclosed, a mandrel is provided upon which is formed, by way of example, a hollow, fiber glass reinforced plastic fishing rod blank; that is, an especially formed laminated, hollow, tapered member adapted to be made into both the butt section and the tip section of a sectional fishing rod. The mandrel is generally tapered throughout its length in the direction of the tip section, and a medial portion thereof is provided with a stepdown portion in the form of a more abrupt taper. A portion of the tip section adjacent to the stepdown is either cylindrical or slightly tapered in the opposite direction; that is, toward the butt section. A portion of the butt section adjacent to said stepdown is either cylindrical or slightly tapered in the opposite direction. The diametric reduction in size at the stepdown portion is such that the straight or reversely tapered portion of the tip section provides a shank, and the straight or reversely tapered portion of the butt section provides a socket adapted to receive the shank telescoped therein.

After the hollow rod blank is cured, the mandrel is forcibly removed and the stepdown portion is cut out thereby leaving a butt section and a tip section adapted to be telescopically connected together by inserting the shank of the tip section into the socket of the butt section.

The hollow rod blank is formed about the mandrel by wrapping the mandrel with plies or layers of resin impregnated fiber glass cloth having the majority of the fibers disposed parallel with the axis of the rod. Exterior and interior grinding of the shank and socket, respectively, are generally desirable to provide a snug intertelescoping fit between the sections, such grinding tending to make the walls of the shank and socket thinner and, in some instances, unduly weakening them. In certain embodiments of the invention, a reinforcing ply of fiber glass is provided at that portion of the mandrel which forms the shank, socket and stepdown in the rod blank whereby said shank and socket will have an increased wall thickness. Said reinforcing ply may be arranged to suit the need of the particular rod being constructed and may be disposed either radially inwardly or outwardly of the plies of the blank laminate, or between said plies. One or more reinforcing plies may be applied and said plies may be disposed on any portion of a rod section to provide extra strength in a particular area or to change the flexural curve of the rod.

Although the present invention as disclosed is embodied in a two-piece fishing rod comprising butt and tip sections, it will be readily understood that the same may be applied to sectional rods of any type and that said sectional rods may have any desired number of sections.

It is the general object of this invention to provide an improved sectional rod of the type set forth above and a method and means for manufacturing the same.

Another object of this invention is to provide a one-piece mandrel for forming a plurality of sections of a sectional rod thereon.

Still another object of this invention is to provide a mandrel having a stepdown portion intermediate the ends thereof which provides a corresponding, disposable stepdown portion in a rod blank formed thereon.

Yet another object is to provide a mandrel as set forth above having shank and socket forming portions on opposite sides of the stepdown portion.

A further object is to provide mandrels of the above type in which the shank and socket forming portions have complementary tapers.

Another object of the invention is to provide a compound mandrel wherein the mandrel comprises a plurality of mandrel sections which are connected together for forming a multisectional rod blank thereon.

A still further object of the invention is to provide a method for manufacturing a plurality of sections of a sectional rod on a one-piece mandrel providing a stepdown portion in the rod blank adapted to be cutaway.

Yet another object is to provide a method as set forth above wherein said mandrel has shank and socket forming portions on opposite sides of the stepdown portion and wherein the rod blank is formed by applying layers or plies of resin impregnated fiber glass cloth to said mandrel with the majority of the fibers of the closet disposed parallel with the axis of the mandrel.

A further object is to provide the above method wherein at least one reinforcing ply is provided around the shank or socket portions, or both.

Another object of the invention is to provide a hollow sectional rod made of plies of resin impregnated fiber glass cloth having the majority of the fibers thereof running longitudinally of the rod, said sections having interfitting shank and socket portions, and said shank portions being reinforced by at least one extra ply or resin impregnated fiber glass cloth.

A still further object of the invention is to provide a hollow sectional rod made of plies of resin impregnated fiber glass cloth having the majority of the fibers thereof running longitudinally of the rod, one or more reinforcing plies being interlaminated at selected portions of one or more sections for extra strength at said selected portions and to modify and control the flexural curve of the rod.

Other objects of the invention and a number of advantages thereof will be apparent from the following description of the invention and the accompanying drawings, in which said drawings:

FIG. 13 is an exploded view on a reduced scale showing a mandrel in its entirety and the pattern of fiber glass cloth for wrapping the mandrel;

FIG. 13a is a detailed view, slightly enlarged, of a modified reinforcing flap or ply;

FIG. 14 is a still further enlarged detail of a medial portion of the mandrel showing the pattern partially wrapped thereon;

FIG. 15 is a slightly enlarged detail similar to FIG. 14 showing a still further modified form of reinforcing ply;

FIG. 16 is a side view on a reduced scale of a modified, sectional mandrel; and

FIG. 17 is an enlarged sectional detail taken generally along the line 17—17 of FIG. 16 showing parts of the sectional mandrel in exploded view.

Figures 1, 2, 3, 4, 5, 6:
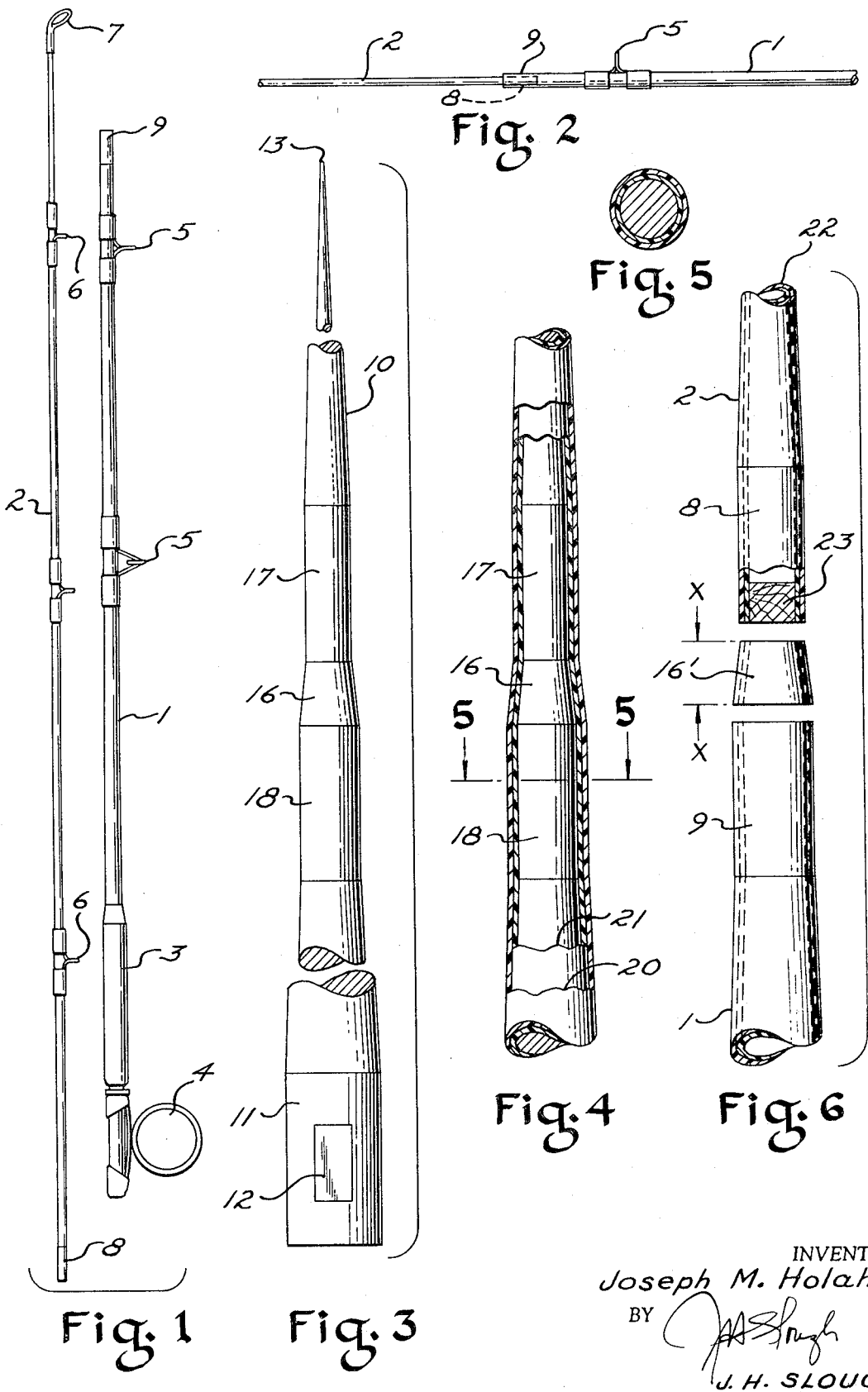
FIG. 1 is a side view of a disassembled sectional fishing rod embodying interengageable shank and socket end portions of the present invention.
FIG. 2 is a partial side view of the fishing rod sections showing the same assembled.
FIG. 3 is an enlarged side view of a mandrel upon which the fishing rod is formed, portions of said mandrel being removed to compress the drawing.
FIG. 4 is a longitudinal section of a part of the mandrel showing the manner in which the fishing rod blank is formed thereon.
FIG. 5 is a transverse section taken along the line 5—5 of FIG. 4.
FIG. 6 is an exploded side view, partially in section, of the part of the blank shown in FIG. 4, the mandrel being removed and a portion of the blank being cut out.

Referring now to the drawings, in all of which like parts are designated by like reference numerals, FIG. 1 shows a two-piece sectional fishing rod comprising a butt section 1 and a tip section 2. The butt section 1 is provided with a conventional grip 3, reel 4, and line eyes 5. The tip section 2 is provided with intermediate line eyes 6 and a line eye 7 disposed at its uppermost end. The butt and tip sections are gradually tapered from the handle end of the butt section 1 to the extreme upper end of the tip section 2 with the larger end of said tip section having a shank 8 adapted to be telescopically fitted into a socket 9 disposed at the smaller end of said butt section. FIG. 2 shows the sections assembled with the shank 8 inserted into the socket 9 whereby the fishing rod is ready for use.

The sectional fishing rod embodying the present invention is formed about a mandrel 10 illustrated in FIG. 3, the illustration showing parts of the mandrel broken away in order to compress the drawing. The mandrel 10 comprises a stem portion 11 having suitable flats 12 formed or machined therein, the stem portion being located at the larger end of the mandrel whereby the same is adapted to be grasped to forcibly pull the mandrel from a fishing rod blank formed thereon. The mandrel 10 as herein illustrated is gradually tapered throughout the greater part of its length from the stem portion 11 to the opposite end thereof where it terminates in a substantially pointed end 13. It will be understood that the distance from the stem portion 11 to the end 13 is slightly longer than the length of the entire rod including both butt and tip sections in their assembled relationship.

The gradual taper of the mandrel 10 is interrupted in the generally medial portion thereof by a more abruptly tapered diametric stepdown portion 16 and cylindrical portions 17 and 18 disposed on either side of said stepdown portion. The taper of the stepdown portion 16 is in the same direction as the general taper of the mandrel; that is, towards the end 13. The cylindrical portion 17 is of the same diameter as and continues from the smaller end of said stepdown portion 16, and the cylindrical portion 18 is of the same diameter as and continues from the larger end of said stepdown portion. Thus, from the stem portion 11 to the stepdown portion 16 the mandrel is adapted to form the butt section 1 of a sectional fishing rod, including a socket 9 which is formed about the cylindrical portion 18. From the stepdown portion 16 to the end 13, said mandrel is adapted to form the tip section 2 of a sectional fishing rod including a shank 8 which is formed around the cylindrical portion 17. Where it is desired to provide a sectional fishing rod having more than two sections, the mandrel can be provided with additional stepdown portions and shank and socket forming portions to provide for a telescopic fit between each adjacent pair of sections.

A multisectional rod having more than two sections can also be formed by providing two or more mandrels of the type shown at 10 in different sizes whereby the diameter of the larger end of one mandrel forms a rod section adapted to interfit a rod section formed on the smaller end of the next larger mandrel.

To form the fishing rod, the mandrel 10 is preferably coated with a suitable nonadhesive substance whereby the mandrel can ultimately be withdrawn from the fishing rod blank formed thereon. Said mandrel is then wrapped in preferably at least two layers or plies 20 and 21 of resin-impregnated, fiber glass cloth having the warp or majority threads thereof running parallel with the axis of the mandrel. Although the plies 20 and 21 have been given separate numbers and are oppositely sectioned in the drawings, it will be understood that the same may actually constitute a single piece of cloth wrapped around the mandrel more than once, as will hereinlater be fully described.

FIG. 6 shows a rod blank laminate, generally indicated at 22, after the mandrel has been pulled therefrom. FIG. 6 also shows a next step in the manufacture of the sectional fishing rod, this step comprising cutting out and removing a stepdown portion 16' of said blank between the dimension lines X—X, said portion 16' being formed around the stepdown 16 of the mandrel 10. Removal of the stepdown portion 16' of the blank 22 thus severs said blank into a butt section 1 and a tip section 2 having a socket 9 and a shank 8, respectively. Also shown in FIG. 6 is a small plug 23 made of any suitable material such as wood, which said plug may be used if desired and inserted in the end of the shank 8 whereby said plug is disposed level with the endmost edge of said shank. The plug 23 adds rigidity to the distal end of the shank 8 and prevents it from flexing or collapsing when inserted into the socket 9.

Figure 7:
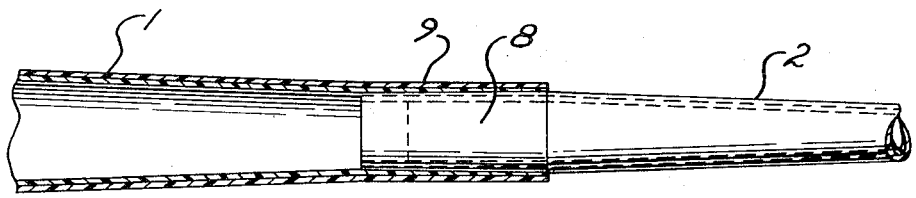
FIG. 7 shows an enlarged detail of the interfitting end portions of the rod sections in assembled relationship, the butt section only being shown in cross section.

FIG. 7 shows an enlarged detail of the assembly of the tip section 2 to the butt section 1 with the shank 8 being telescoped snugly within the socket 9. The external surface of the shank 8 and the internal surface of the socket 9 are preferably ground to provide a tapered fit between shank and socket and as herein illustrated, have been provided with slight complementary tapers to insure such fit. Thus the outer surface of the shank 8 is tapered slightly in the direction of the butt section and the internal surface of the socket is flared slightly in the direction of the tip section.

Figure 8:
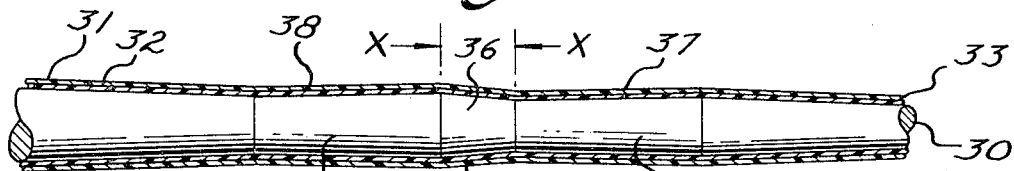
FIG. 8 is a view similar to FIG. 4 showing a modified mandrel of the present invention.

FIG. 8 shows a modified mandrel 30 having two plies 31 and 32 of resin impregnated fiber glass cloth wrapped therearound to form a fishing rod blank 33. The mandrel 30 is substantially identical with the mandrel 10 with the exception that the shank and socket forming portions, shown at 34 and 35, respectively, are provided with slight reverse tapers in the direction opposite to the general taper of the mandrel. The mandrel 30 is provided with a stepdown portion 36 identical with the stepdown portion 16 of the first embodiment, the shank forming portion 34 extending from the smaller end of said stepdown portion and the socket forming portion 35 extending from the larger end of said stepdown portion. The rod blank 33 is thus provided with a stepdown portion 36' formed around the stepdown portion 36 of the mandrel and is further provided with a reversely tapered shank 37 and socket 38. After the mandrel is pulled, the stepdown portion 36' of the blank 33 is removed (this portion being indicated between the dimension lines X—X of FIG. 8) and the tapered shank 37 is adapted to be telescoped into the socket 38. As in the first embodiment, the external surface of the shank 37 and the internal surface of the socket 38 are preferably ground somewhat to provide a perfect fit therebetween. It will also be understood that the tip end portion of the shank 34 may be provided with a plug such as that shown at 23 in FIGS. 6 and 10.

Figure 9:
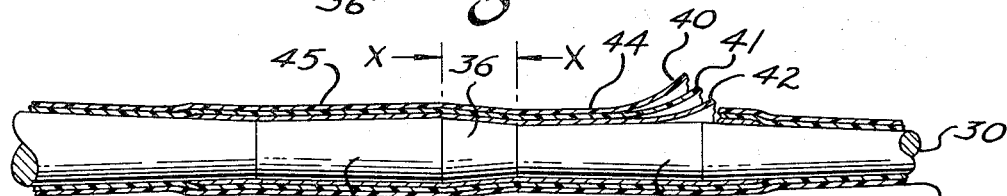
FIG. 9 shows the mandrel of FIG. 8 with a modified blank formed thereon, parts of the laminate being peeled away from the mandrel to clarify the construction.

FIG. 9 shows a modified rod blank laminate construction, the same being formed around a mandrel 30 as shown in FIG. 8 having a stepdown portion 36 and reversely tapered shank and socket forming portions 34 and 33 respectively. The modified rod blank comprises two plies, 40 and 41 of resin impregnated fiber glass cloth which correspond to the plies 20 and 21 of FIG. 4 and extend the full length of the mandrel. Inwardly of the plies 40 and 41 and adjacent to the mandrel 30 there is provided a reinforcing ply 42 which extends over the stepdown portion 36, the shank forming portion 34, and the socket forming portion 35 and projects longitudinally a slight distance beyond said shank and socket forming portions. As herein illustrated, the reinforcing ply 42 is shown with straight line sectioning for the purpose of making it show up more clearly. However, it will be understood that said reinforcing ply is also a layer of resin impregnated fiber glass cloth.

The reinforcing ply 42 is wrapped upon the mandrel in the same manner as the plies 40 and 41, although it extends a lesser axial distance than the said plies 40 and 41.

Figure 10:
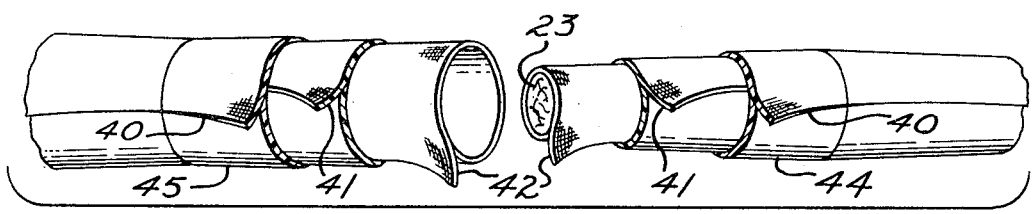
FIG. 10 is an exploded perspective of the interengageable blank and socket end portions of the fishing rod sections, portions of the plies being removed and peeled away to clarify the construction.

The modification of FIG. 9 provides a rod blank 43 having a removable stepdown portion 36" and reinforced shank and socket portions 44 and 45, respectively. FIG. 10 shows the modified rod of FIG. 9 after the butt and tip sections have been separated with certain portions of the plies peeled away to clarify the construction thereof. As shown at 23, a plug may be provided in the tip end portion of the shank 44. The reinforcing ply 42 thickens the shank and socket portions whereby the same are prevented from being unduly weakened by grinding and fitting operations.

Figure 11:
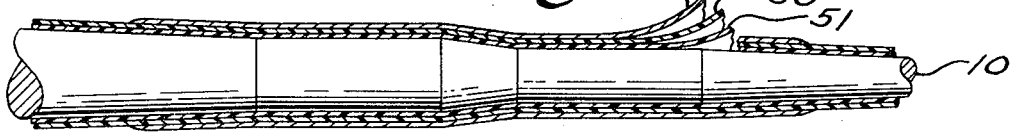
FIG. 11 is a view similar to FIG. 9 showing the mandrel of FIG. 3 with a further modified blank formed thereon.
Figure 12:
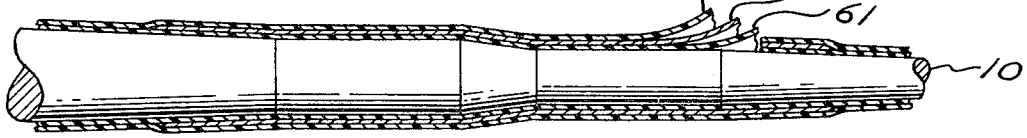
FIG. 12 is a view similar to FIG. 11 showing the mandrel of FIG. 3 with a still further modified blank formed thereon.

FIGS. 11 and 12 show variations of the application of a reinforcing ply, the same being shown formed upon a mandrel 10 of the type shown in FIG. 3. In FIG. 11, a plurality of continuous main plies 50 and 51 are disposed about the mandrel adjacent thereto with a reinforcing ply 52 being disposed externally around the main plies 50 and 51. In the modification of FIG. 12, the mandrel 10 is covered with two main plies 60 and 61 extending the full length of the mandrel, and an internal or intermediate reinforcing ply 62 which is disposed between the main plies 60 and 61. As in the embodiment of FIGS. 9 and 10, the reinforcing plies 52 and 62 of FIGS. 11 and 12, respectively, are cross-sectioned differently from the main plies for the purpose of clarifying the construction.

FIGS. 13 and 14 show the manner in which the fiber glass cloth is wrapped upon a mandrel to form the main plies and the reinforcing ply of a rod blank 43 as illustrated in FIGS. 9 and 10. As herein illustrated, a pattern 46 of fiber glass cloth is provided, said pattern having a straight, elongated edge 47 adapted to be tacked to the mandrel 30 along the length thereof as shown in FIG. 14. An opposite edge 48 of the pattern 46 is tapered from the larger end of the mandrel to the tip or smaller end thereof whereby when said pattern is rolled onto the mandrel, each part of said mandrel will have approximately the same number of layers or plies of the cloth.

Intermediate the ends of the mandrel 30, in the area of the stepdown portion 36, shank forming portion 34, and socket forming portion 35, there is provided a small reinforcing flap 53 of generally the same shape as the pattern 46 having a tapered extension 54 projecting longitudinally from the smaller end thereof. A straight edge 55 of said flap and extension is disposed in alignment with the straight edge 47 of the pattern 46, and said pattern and flap are tacked to the mandrel along their aligned edges prior to being rolled onto the mandrel. Tacking may be effected in any suitable manner such as by means of a coating of uncured resin applied adjacent to said edges to cause the same to adhere to the mandrel.

The pattern 46 is of sufficient width to provide the two plies 40 and 41 of FIG. 9 when the pattern is rolled onto the mandrel, and the flap 53 becomes the internal, reinforcing ply 42. The fiber glass cloth of the pattern 46 is unidirectional in construction having a majority of the fibers thereof oriented in one direction, and said pattern is so cut that these majority fibers, indicated at 46', extend parallel with the axis of the mandrel. The fiber glass cloth of the reinforcing flap 53 is preferably but not necessarily bidirectional in construction having substantially equal numbers of fibers in both warp and woof thereof. Said flap is so disposed as to provide the extra strength and flexibility that the joint requires and may be so cut that some of the fibers are parallel with the axis of the mandrel and the remaining fibers perpendicular thereto. Said flap may also be cut on the bias whereby both the warp and woof are at an angle with respect to the axis of the rod. An example of a reinforcing flap cut on the bias is shown at 53a in FIG. 13a wherein the fibers of the warp and woof are disposed at a 45° angle with respect to the axis of the mandrel and the longitudinally disposed fibers 46' of the pattern 46.

Any suitable plastic may be used to impregnate the fiber glass cloth of the pattern 46 and flap 53. One very satisfactory method is to use a fiber glass cloth which is preimpregnated with a polyester resin whereby the application of heat thereto causes the resin to first liquefy and then harden. Thus the layers or plies are fused into an integral unit.

If the reinforcing ply is to be located radially outwardly of the main plies as shown at 52 in FIG. 11, the flap 53 is positioned in substantially the position shown in broken lines in FIG. 13 on the outer or back side of the pattern whereby upon rolling said pattern onto the mandrel, the reinforcing ply will be radially outwardly of the main plies. By placing the flap 53 in the same broken line position on the inner or front side of the pattern 46, the reinforcing ply can be located between the main plies as shown at 62 in FIG. 12. Only the pattern 46 is applied to the mandrel in the manner shown and described when forming a rod blank of the type shown at 22 in FIG. 6. It will be understood that a blank of this type may be formed on either the mandrel 16 or 30.

Reinforcing plies or flaps as described above may be placed at any point along a rod section to strengthen a particular part of the rod or to modify and control the flexural characteristics of the rod in a particular part. These extra reinforcing flaps may be radially inwardly of the rod in the manner of FIG. 9, on the radially outermost surface of the rod in the manner of FIG. 11, or interleaved with the main plies in the manner of FIG. 12. Thus, a flap 64 shown adjacent to the tip end of the mandrel will, when rolled upon the mandrel, provide an inner reinforcing ply strengthening and changing the flexural characteristics of the tip section of the rod. On the other hand, a flap as shown in dotted lines at 65 adjacent to the butt forming section of the mandrel outwardly of the pattern 46 will provide an outer reinforcing patch in this area of the rod. Interleaving of the flap 64 or 65 with the plies is attained by placing the patch or flap either on the inner or outer surface of the pattern 46 intermediate the edges 47 and 48 thereof.

FIG. 15 discloses a modification of the reinforcing flap, which said modified flap is particularly adapted to reinforce the shank and socket portions of the rod. The modified flap is shown at 70 and is generally Z-shape in form as seen in FIG. 15 having a center strip 71, a lateral projection 72 adjacent to one end thereof, and a lateral projection 73 adjacent to the opposite end thereof. It will be noted that the lateral projections 72 and 73 project at right angles in opposite directions from the center strip 71 whereby they will form reinforcing plies at axially spaced portions on the rod.

In the example of the modified flap 70 as shown, the lateral projection 72 is disposed with its lower longitudinal edge parallel with the straight elongated edge 47 on the inner side of the pattern in such position that it will provide an inner reinforcing ply around the shank forming portion 34 of a mandrel 30. The center strip 71 is disposed adjacent to the stepdown 36 of the mandrel and is of sufficient length whereby the lateral projection 73 is disposed beyond the tapered edge 48 of the pattern 46. The lateral projection 73 is so disposed that it will provide an outer reinforcing patch adapted to be wrapped around the socket forming portion 35 of the mandrel 30. Thus, by using only a single flap, the rod blank will be provided with a reinforcing ply on the inner surface of the shank and another reinforcing ply on the outer surface of the socket. The center strip 71 will be wrapped around the stepdown 36 and will be removed when the corresponding stepdown in the rod blank is removed or cut out in the manner set forth above.

FIG. 16 shows the manner in which a mandrel 80 may be provided for forming thereon a sectional rod having more than 2 sections. The mandrel 80 has butt section forming portion 81, a tip section forming portion 84, and two intermediate section forming portions 82 and 83. Between adjacent pairs of section forming portions 81–82, 82–83 and 83–84 there are provided socket, stepdown, and shank forming portions of appropriate size generally indicated at 87, 88, and 89 whereby complementary adjacent sections are formed in the manner described above.

The mandrel 80 shown in FIG. 16 may be integral throughout or may be formed in separate lengths connected together by any suitable means such as that given by way of example in FIG. 17. In the example shown, the mandrel 80 is divided into two mandrel parts 80' and 80'', one part comprising the section forming portions 81 and 82 and the other part comprising the section forming portions 83 and 84. The means of connection shown is that of providing the mandrel part 80' with a threaded coaxial socket 90 and providing the part 80'' with an axially projecting threaded stud 91. Thus, the mandrel 80 may be actually manufactured in smaller parts which can be attached together to provide a unitary mandrel for forming thereon a sectional rod having any number of interfitting sections.

In each embodiment of the invention, two main plies extending the full length of the mandrel are shown. However, it will be readily understood that any suitable number of plies may be used depending upon the size and strength of the rod to be made and the ultimate weight desired. It will also be further understood that ply thicknesses and tapered angles in the drawings have been exaggerated to clarify the construction.

I claim:

1. The method of making a sectional fiber glass rod comprising the step of providing an elongated mandrel which is generally tapered in one axial direction throughout its length and has at least one diametric stepdown portion intermediate the ends thereof, the stepdown being in the same axial direction as the taper, and there being a shank forming portion projecting axially from the smaller end of the stepdown portion and a socket forming portion projecting axially from the larger end of the stepdown portion; the step of encasing the mandrel in fiber glass reinforced plastic and curing the same to form a fiber glass rod blank having at least one stepdown portion with a shank formed adjacent to the smaller end of the stepdown portion and a socket for receiving the shank formed adjacent to the larger end of the stepdown portion; the step of pulling the mandrel out of the fiber glass rod blank; and the step of cutting out and removing the stepdown portion of the blank whereby the blank is severed into two sections, one section having a socket and another section having a shank adapted to be inserted into the socket.

2. The method of claim 1 wherein the shank and socket forming portions of the mandrel are tapered in the axial direction opposite to the general taper of the mandrel whereby the socket and shank have a tapered fit.

3. The method of making a sectional fiber glass rod comprising the step of providing an elongated mandrel which is generally tapered in one axial direction throughout its length and has at least one diametric stepdown portion intermediate the ends thereof, the stepdown being in the same axial direction as the taper, and there being a shank forming portion projecting axially from the smaller end of the stepdown portion and a socket forming portion projecting axially from the larger end of the stepdown portion; the step of encasing the mandrel in fiber glass reinforced plastic and curing the same to form a fiber glass rod blank having at least one stepdown portion with a shank formed adjacent to the smaller end of the stepdown portion and a socket for receiving the shank formed adjacent to the larger end of the stepdown portion; the step of pulling the mandrel out of the fiber glass rod blank; and the step of cutting out and removing the stepdown portion of the blank whereby the blank is severed into a butt section and a tip section having a socket and shank, respectively; the step of encasing the mandrel in fiber glass reinforced plastic comprising wrapping the mandrel in resin impregnated fiber glass cloth.

4. The method of claim 3 wherein the fiber glass cloth is unidirectional in construction having the majority of the fibers thereof oriented in one direction and is disposed with the majority of its fibers parallel with the axis of the mandrel; and the step of wrapping the shank, stepdown, and socket forming portions of the mandrel with a reinforcing ply made out of fiber glass cloth.

5. The method of claim 4 wherein the reinforcing ply is disposed adjacent to the mandrel.

6. The method of claim 4 wherein the reinforcing ply is disposed outside of the first mentioned fiber glass cloth.

7. The method of claim 4 wherein at least two layers of the first mentioned fiber glass cloth are wrapped upon the mandrel with the reinforcing ply being disposed between said two layers.

8. The method of claim 3 including the step of wrapping the shank, stepdown, and socket forming portions of the mandrel with a reinforcing ply of fiber glass cloth, a part of the reinforcing ply being disposed adjacent to the mandrel and another part of the reinforcing ply being disposed outside of the first mentioned fiber glass cloth.

9. The method of claim 4 wherein the reinforcing ply has a substantially equal number of fibers in the warp and woof thereof, the reinforcing ply being so oriented with respect to the axis of the mandrel that one-half of said fibers are parallel with the axis of the mandrel and the other half of the fibers are perpendicular to said axis.

10. The method of claim 4 wherein the reinforcing ply is a bidirectional fiber glass cloth having the fibers of the warp and woof thereof disposed at an angle with respect to the axis of the mandrel.

11. The method of claim 10 wherein the fibers of the warp and woof of the reinforcing ply are disposed at substantially a 45° angle with respect to the axis of the mandrel.

12. The method of making a sectional fiber glass rod comprising the step of providing an elongate mandrel which is generally tapered in one axial direction throughout its length and has at least one diametric stepdown portion intermediate the ends thereof, the stepdown being in the same axial direction as the taper, and there being a shank forming portion projecting axially from the smaller end of the stepdown portion and a socket forming portion projecting axially from the larger end of the stepdown portion; the step of encasing the mandrel in fiber glass reinforced plastic and curing the same to form a fiber glass rod blank having at least one stepdown portion with a shank formed adjacent to the smaller end of the stepdown portion and a socket for receiving the shank formed adjacent to the larger end of the stepdown portion; the step of pulling the mandrel out of the fiber glass rod blank; and the step of cutting out the stepdown portion of the blank thereby providing one section having a socket and another section having a shank adapted to be inserted into the socket, the step of encasing the mandrel in fiber glass reinforced plastic comprising providing an elongated pattern of fiber glass cloth having a first longitudinal edge and an opposite, second longitudinal edge; providing a reinforcing flap superimposed upon the pattern, the flap having a transverse portion extending from the first longitudinal edge to and beyond the second longitudinal edge, the transverse portion having transversely directed ends and substantially right angularly directed projections extending from the ends in opposite directions substantially parallel with the pattern, one of the projections being adjacent to the first longitudinal edge and the other projection being disposed outwardly beyond the second longitudinal edge; disposing the pattern longitudinally parallel with the mandrel with the transverse portion of the flap aligned with the stepdown portion of the mandrel and wrapping the mandrel with the flap disposed inwardly of the wrap whereby the one projection is wrapped around the one forming portion of the mandrel inwardly of the pattern and the other projection is wrapped around the other forming portion of the mandrel outwardly of the pattern; and curing an impregnating plastic in the pattern and reinforcing flap.

13. The method of claim 12 wherein the one projection is wrapped around the shank forming portion of the mandrel and the other projection is wrapped around the socket forming portion of the mandrel.

* * * * *